United States Patent
Miyamoto et al.

(10) Patent No.: US 6,865,061 B2
(45) Date of Patent: Mar. 8, 2005

(54) DISK DRIVE (75) Inventors: Makoto Miyamoto, Hyogo (JP);
Hideki Kuwajima, Kyoto (JP);
Kenichi Sakamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 86 days.

(21) Appl. No.: 10/348,573

(22) Filed: Jan. 21, 2003

(65) Prior Publication Data

US 2003/0165032 A1 Sep. 4, 2003

(30) Foreign Application Priority Data

Jan. 28, 2002 (JP) ........................................ 2002-018049

(51) Int. Cl.⁷ ............................................... G11B 21/22
(52) U.S. Cl. ................................................. 360/264.1
(58) Field of Search .......................... 360/264.1, 264.2, 360/264.3, 264.4, 265.1

(56) References Cited

U.S. PATENT DOCUMENTS 6,137,658 A    10/2000  Matsuzaki et al.
6,172,855 B1 *  1/2001  Kim ........................... 360/256
6,208,489 B1 *  3/2001  Marchon .................. 360/294.7
6,388,842 B1 *  5/2002  Murphy ..................... 360/244.8
6,606,223 B2 *  8/2003  Ooi et al. ................. 360/264.9
6,680,823 B2 *  1/2004  Wood et al. .............. 360/265.1

FOREIGN PATENT DOCUMENTS

| JP | 6-44714    | 2/1994 |
| JP | 11-96699   | 4/1999 |
| JP | 11-259999  | 9/1999 |
| JP | 2000-30385 | 1/2000 |

* cited by examiner

Primary Examiner—A. J. Heinz
Assistant Examiner—Mark Blouin
(74) Attorney, Agent, or Firm—RatnerPrestia (57) ABSTRACT A disk drive is rotatably disposed in a direction vertical to the recording surface of a recording medium. The disk drive comprises a support arm having a head at one side thereof, and a first member which abuts the other end of the support arm, generating a frictional force between the member and the support arm, when the support arm is moved in a direction along the recording surface of the recording medium.

9 Claims, 8 Drawing Sheets

DISK DRIVE

TECHNICAL FIELD

The present invention relates to a disk drive, particularly to a disk drive using a flying type head such as a magnetic head, optical head or optical magnetic head.

BACKGROUND ART

Regarding the configuration of a conventional disk drive, a magnetic disk drive will be described as an example.

Recently, due to the market expansion of portable information equipment such as personal computers and the miniaturization of devices, it is now necessary for a magnetic disk drive as a leading storage means to satisfy the requirements such as high portability, that is, being smaller, thinner, and excellent in impact(shock) resistance.

Figure 8:
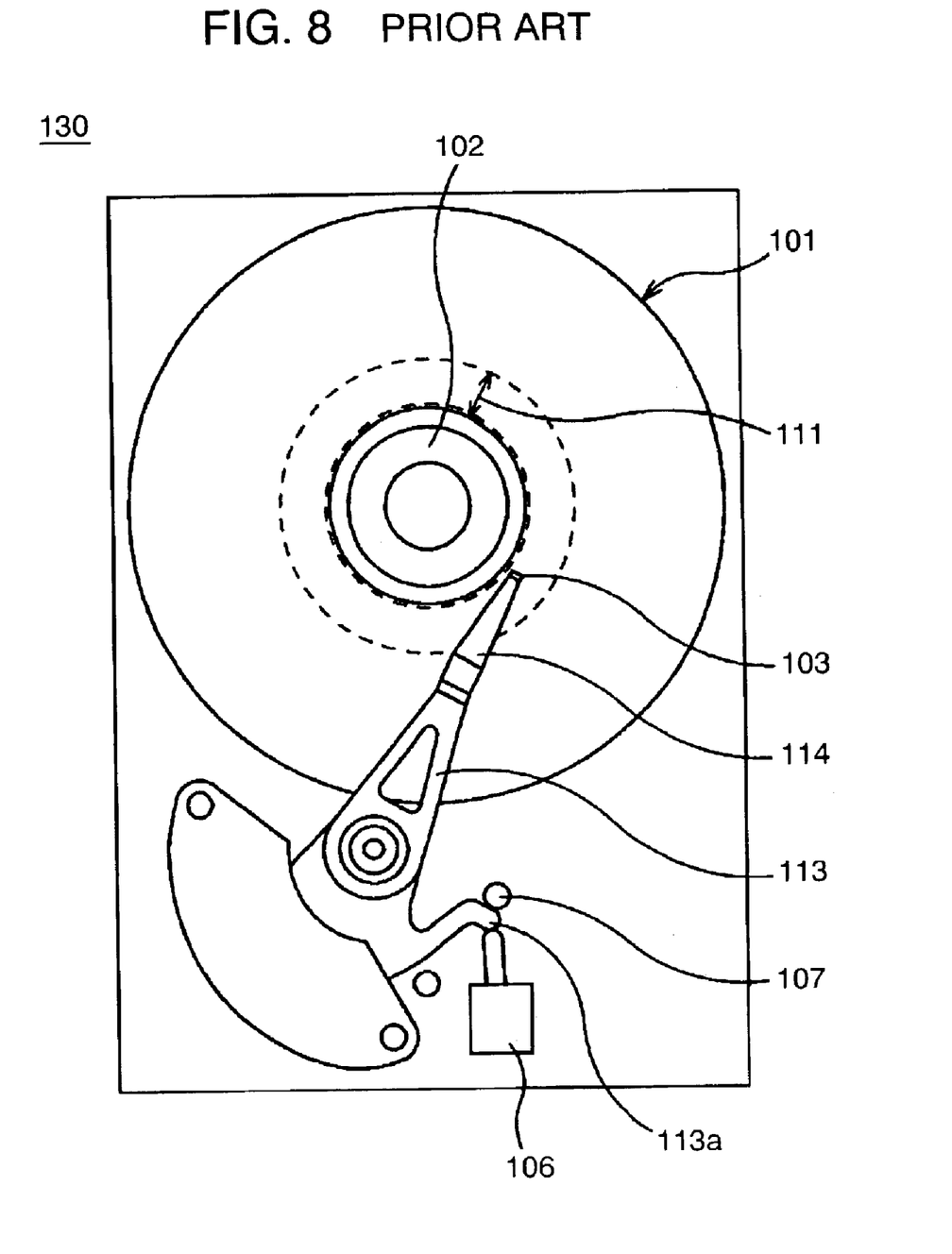
FIG. 8 is a plan view showing the configuration of a conventional CSS type magnetic disk drive.

Conventionally, as a loading system for a head support unit in a magnetic disk drive using a flying type magnetic head, a system called contact start/stop system (hereinafter referred to as CSS) has been employed. FIG. 8 is a plan view showing the configuration of a conventional magnetic disk drive based on the CSS system.

In CSS type magnetic disk drive 130 shown in FIG. 8, during operation, that is, while magnetic recording medium 101 is rotated by spindle motor 102, because of the flying force of slider 103 having a magnetic head (not shown) due to the air flow then generated and the activating force of suspension 114 mounted on head support unit 113 which moves the slider 103 to the magnetic recording medium 101, the magnetic head mounted on the slider 103 obtains a specific amount of flying hight against the magnetic recording medium 101 while executing the recording or reproducing(reading) operation.

Also, when stopping the magnetic recording medium 101, with the rotating speed of the magnetic recording medium 101 lowered, the air flow weakens and the flying force decreases, and finally, the slider 103 comes into contact with the magnetic recording medium 101 and then stops.

Further, in many of conventional CSS type magnetic disk drive units, there is provided CSS area 111 as an area in which the magnetic head takes shelter within an area other than the effective recording area on the magnetic recording medium 101.

However, in conventional CSS type magnetic disk drive 130, when stopped, the magnetic head or slider 103 is attracted to the magnetic recording medium 101, and in order to eliminate the attraction(stiction), it is necessary to properly increase the starting torque of the spindle motor 102 which drives the magnetic recording medium 101, making it hard to reduce the size of the magnetic disk drive. Further, there has been a problem such that if the magnetic head or slider 103 attracted to the magnetic recording medium 101 is forcibly removed by the rotation of the spindle motor 102, the magnetic recording layer formed on the surface of the magnetic recording medium 101 will be mechanically or magnetically damaged.

In order to solve these problems, various technologies have been proposed in the past.

For example, in a magnetic disk drive as shown in FIG. 8, one of the proposals is that when the slider 103 provided with a magnetic head is within the CSS area 111, projection 113a is disposed at the other end opposite to one end thereof where the slider 103 of head support unit 113 is disposed, and the projection 113a is pressed by lock means 106 against stopper pin 107 in order to hold the head support unit 113 (e.g. Japanese Laid-open Patent H11-259999).

However, in a magnetic disk drive which holds the head support unit by electrically controlling the lock means as described above, it is necessary to additionally provide a control device for controlling the lock means. Further, a member such as a stopper pin is newly required, causing great hindrance to the miniaturization of a magnetic disk drive.

Furthermore, a load/unload system (hereinafter referred to as L/UL system) is widely employed as an example of loading system that is different from the CSS system. Also in the L/UL type magnetic disk drive, a configuration of holding a support arm by using magnetic action is disclosed in Japanese Laid-open Patent H11-96699, and a configuration of having a fitting means such as a stopper pin as described above is disclosed in Japanese Laid-open Patent 2000-30385. In these disk drive units, same as in the CSS system, it is necessary to newly dispose a member such as a magnet or stopper pin in the casing, causing great hindrance to the miniaturization of the magnetic disk drive.

Further, in a conventional disk drive, a highly flexible suspension is disposed at the end of its head support unit. Also, at its support arm, the center of gravity is positioned at one end where the slider is located. Due to such configuration, while the slider provided with a magnetic head is stopping on the magnetic recording medium, when impact or vibration from outside is applied to the magnetic disk drive, in the case of a conventional magnetic disk drive, there has been a problem such that the slider provided with a magnetic head moves just like jumping on the magnetic recording medium, causing the magnetic recording layer of the magnetic recording medium surface to be damaged. However, the problem has not been solved even by the configuration of holding the other end of the support arm by using a stopper pin or magnet as is in the conventional CSS type and L/UL type magnetic disk drive units described above.

DISCLOSURE OF THE INVENTION

In order to solve the problems, the present invention is intended to provide a disk drive having a simple configuration and ensuring high impact (shock) resistance.

A disk drive of the present invention is installed in a direction vertical to the recording surface of a recording medium, and comprises a support arm having a head at one end thereof, and a first member which abuts the other end of the support arm when the support arm is moved in a direction along the recording surface of the recording medium, thereby generating a frictional force against the support arm.

Due to this configuration, when the support arm is moved in a direction along the recording surface of the recording medium, a frictional force is generated by the first member which abuts the other end of the support arm. Accordingly, it is possible to improve the impact resistance, holding the support arm by using the frictional force.

Also, it is preferable to use a configuration such that the first member pushes the other end of the support arm to make it approach the recording medium.

In such configuration, since the support arm is able to rotate in a direction vertical to the recording surface of the recording medium, it is possible to effectively prevent the head or slider disposed at one end of the support arm from being attracted to the recording surface of the recording medium. Further, it is possible to realize a configuration in which the load applied to the spindle motor or a rotating means for the recording medium is reduced as much as possible at start of the motor.

It is also preferable to use a configuration such that one end of the support arm moves off from the recording surface of the recording medium when the first member pushes the other end of the support arm to make it approach the recording medium.

Due to this configuration, the head or slider can be held away from the recording surface of the recording medium, and the load applied to the spindle motor or a rotating means for the recording medium can be more reduced at start of the motor, and thereby, it is possible to realize the miniaturization of the spindle motor. Further, a configuration requiring no ramp portion in an L/UL type disk drive can be realized, and also, it is possible to provide a disk drive capable of holding the support arm apart from the recording surface in any place on the magnetic recording medium, thereby enabling the miniaturization of the disk drive.

Moreover, it is also preferable to be configured in that the support arm stops rotating when the first member abuts the other end of the support arm.

According to this configuration, it is possible to provide a disk drive ensuring excellent impact resistance because the support arm can be effectively held.

Also, it is preferable to use a configuration such that a projection is disposed at the other end of the support arm, and a catch hole is formed in the first member, and the support arm stops rotating when the projection is fitted into the catch hole.

With this simplified configuration, it is possible to precisely secure the support arm.

It is also preferable to be configured in that the support arm comprises a bearing portion provided with a second member coming in contact with the support arm and that the support arm rotates in a direction vertical to the recording surface of the recording medium about the point at which the second member comes in contact with the support arm.

By using such a simplified configuration, the rotational center in a direction vertical to the recording surface of the recording medium can be accurately set, and it becomes possible to realize more precise positioning control of the head.

Also, the second member is preferable to be a pivot bearing having a pair of peaks. According to the configuration, a highly practical and more simplified construction can be realized.

Also, it is preferable that the support arm rotates about the bearing portion in a direction along the recording surface of the recording medium. According to the configuration, it is possible to miniaturize the disk drive.

Further, the point at which the second member comes in contact with the support arm is preferable to be vertical to the axial direction of the bearing portion and to the longitudinal direction of the support arm and is on a line passing through the rotational center of the bearing portion. According to the configuration, it is possible to accurately set the rotational center for obtaining a high degree of weight balance in the longitudinal direction of the support arm and to precisely execute the positioning control of the head.

It is also preferable to be configured in that the point at which the second member comes in contact with the support arm is provided at a position symmetrical in relation to the center line in the longitudinal direction of the support arm. According to the configuration, it is possible to realize a construction ensuring a high degree of weight balance in the transverse direction thereof.

Furthermore, it is also preferable to be configured in that there is provided a resilient portion which gives a force to the support arm so as to make one end of the support arm approach the recording surface of the recording medium.

By using such a configuration, parts having rigidity and those having resilience can be respectively disposed as separate members. That is, it is possible to form the support arm by using highly rigid members and on the other hand to freely adjust the force against the slider by changing the material and thickness of the resilient members. Accordingly, when an external impact (shock) is applied to the disk drive, the disk drive assures excellent impact resistance and high resonant frequency, and therefore, it is possible to provide a disk drive capable of ensuring high response characteristic and high-speed access.

Also, the resilient portion is preferable to be a plate spring. By such a configuration, it is possible to provide a disk drive capable of easily ensuring high response characteristic and high-speed access as described above and to realize a disk drive which is reduced in thickness in a direction vertical to the recording medium.

Further, the center of gravity of the portion being held by the resilient portion is positioned at the intersection between the axis of the bearing portion and the rotational center axis in a direction vertical to the recording surface of the recording medium of the support arm. Due to the configuration, it is possible to minimize the unnecessary vibration of the support arm when an external impact (shock) is given thereto.

It is also preferable to use a configuration such that the recording medium is rotatably supported and there is provided a drive unit for rotating the recording medium. Due to this configuration, it is possible to make a small-size and large-capacity disk drive.

Also, it is preferable to be configured in that there is provided a slider having a head at one end of the support arm. According to the configuration, it is possible to improve the impact resistance by designing the surface (air bearing surface) to be opposed to the recording surface of the recording medium of the slider.

Also, the support arm is preferable to be provided with a gimbal mechanism which movably supports the slider in the rolling direction and pitching direction. By using this configuration, when the disk drive executes recording and reproducing operation, the gimbal mechanism may absorb the unnecessary inclination of the slider in the rolling and pitching directions against the recording medium.

Further, it is preferable to use a configuration such that there are provided a coil at the other end of the support arm, a pair of yokes arranged on either side of the passage where the coil moves along with the movement of the support arm, and a voice coil motor comprising a magnet disposed between the paired yokes, and that the first member is one of the paired yokes, an upper yoke disposed above the coil. According to the configuration, a disk drive which is smaller, thinner, and having excellent impact resistance can be easily realized because it is not necessary to newly form a first member. Also, since the support arm is driven by the voice coil motor, the support arm can be rotated at a high speed.

It is also preferable to use a configuration such that the support arm is moved in a direction along the recording surface of the recording medium, and when one end of the support arm is opposed to an area other than the effective recording area of the recording surface, the first member abuts the other end of the support arm and generates a frictional force between the member and the support arm. According to the configuration, for example, since the support arm is held when one end of the support arm comes into an CSS area, shelter area for head in the CSS system, or into an outside area other than the effective recording surface of the recording medium in the L/UL system, it is possible to improve the impact resistance when the support arm of the disk drive is in a shelter position such as in the stop mode of the disk drive unit.

DETAILED DESCRIPTION OF PREFERRED EMBODIMENTS (First Preferred Embodiment)

The preferred embodiments of the present invention will be described in the following with reference to the drawings.

Figure 1:
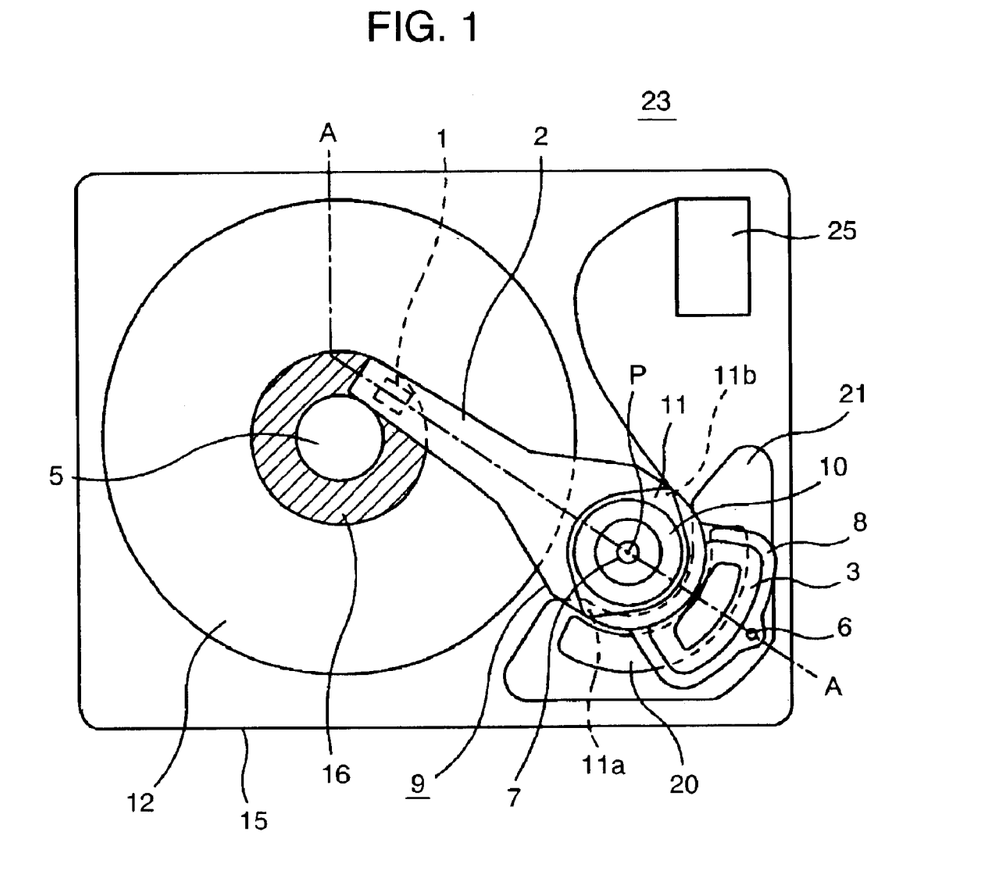
FIG. 1 is a plan view showing the configuration of a magnetic disk drive in the preferred embodiment of the present invention.
Figure 2:
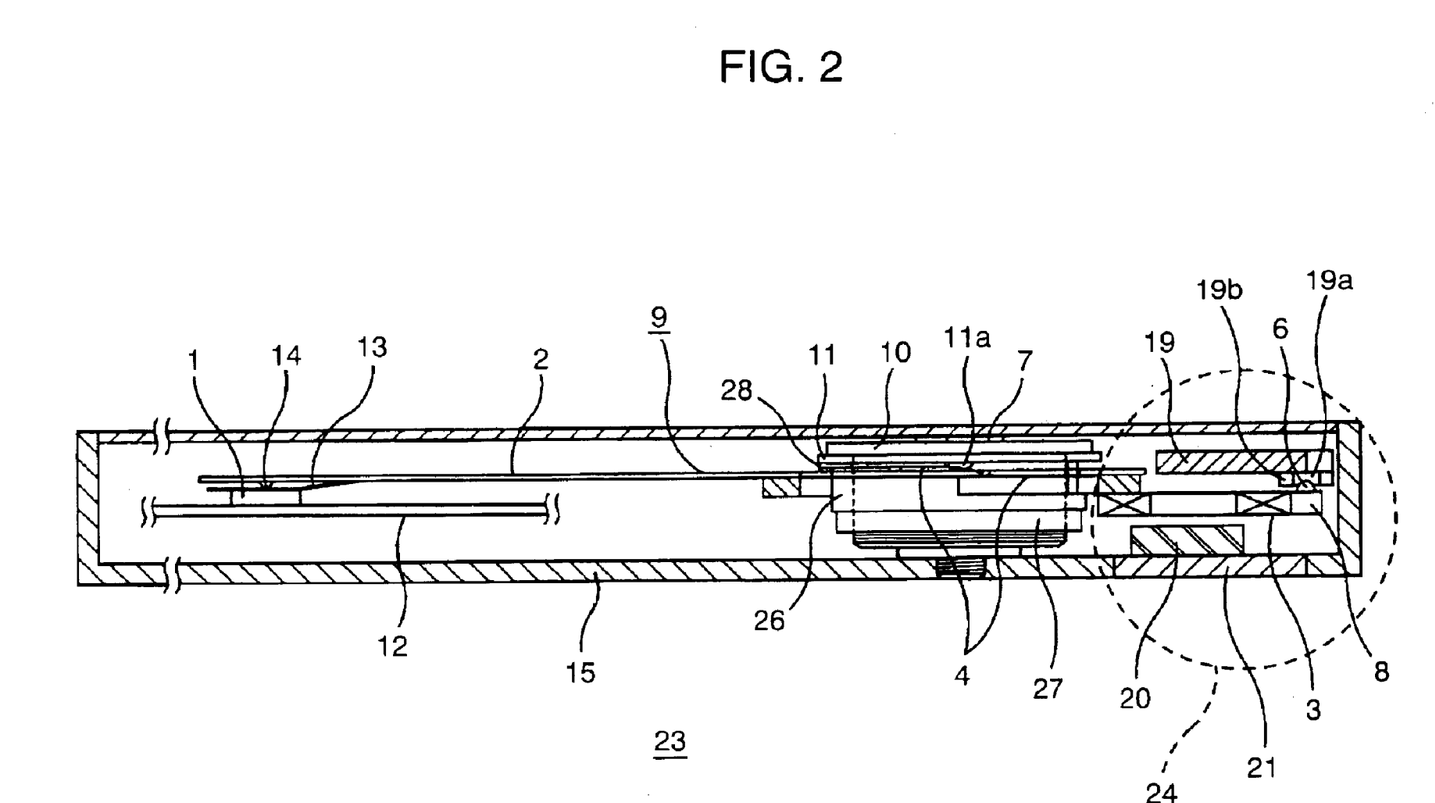
FIG. 2 is a section view showing the configuration of a magnetic disk drive in the preferred embodiment of the present invention.

FIG. 1 is a plan view showing the configuration of a magnetic disk drive of the present invention. FIG. 2 is a sectional view along the AA line in FIG. 1.

First, the configuration and operation of the magnetic disk drive and its head support unit of the present invention are described.

In FIG. 1 and FIG. 2, the magnetic disk drive is in a stop mode, that is, the magnetic recording medium is in a state of having stopped rotating.

Magnetic disk drive 23 of the present invention is provided with head support unit 9 having support arm 2 integrally formed as shown in FIG. 1 and FIG. 2.

Figure 3:
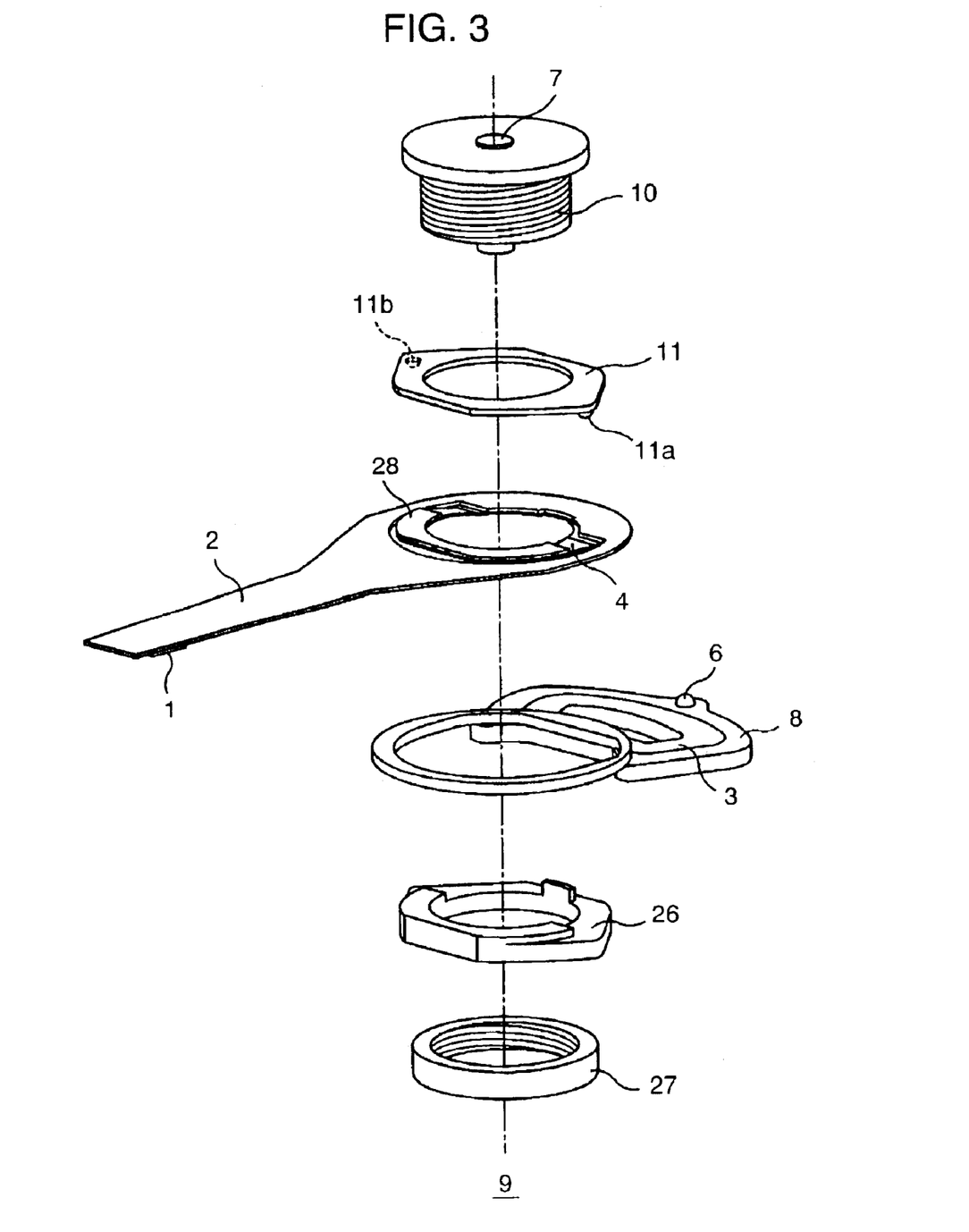
FIG. 3 is an exploded perspective view showing the configuration of a head support unit of a magnetic disk drive in the preferred embodiment of the present invention.

The configuration of the head support unit 9 of the magnetic disk drive 23 of the present invention will be described by using FIG. 1, FIG. 2 and FIG. 3. FIG. 3 is an exploded perspective view showing the configuration of the head support unit 9 of the magnetic disk drive 23 of the present invention.

The head support unit 9 is configured in that a nearly annular plate spring 4 and a semi-annular spring fixing member 28 as shown are connected with each other in the left-hand area of the figure of the rotary shaft of bearing portion 10 in FIG. 2, and the plate spring 4 is connected to a support arm 2 in the right-hand area of the figure of the rotary shaft. The support arm 2 is connected to a coil holder 8 with coil 3 fitted thereto so that it can be rotated by the action of a voice coil motor radially of magnetic recording medium 12. These members are held between the bearing portion 10 and nut 27, together with pivot bearing 11 having a pair of peaks 11a, 11b, and collar 26.

By using such configuration, as shown in FIG. 2, the support arm 2 is resiliently held on the pivot bearing 11 having the paired peaks 11a, 11b via the plate spring 4, and the support arm 2 is fulcrumed on the paired peaks 11a, 11b of the pivot bearing 11 and is able to rotate in a direction vertical to the magnetic recording medium 12.

The paired peaks 11a, 11b formed on the pivot bearing 11 are vertical to the axial direction of rotational center and to the longitudinal direction of support arm 2 when the support arm 2 is rotated radially of the magnetic recording medium 12, and on the line passing through the rotational center axis, come to abut the support arm 2 at a position symmetrical in relation to the center line of the support arm 2.

Here, the present invention is not limited at all with respect to the shapes of the peaks 11a, 11b of the pivot bearing 11. As shown in Fig.1 and FIG. 2, the peaks 11a, 11b are preferable to be shaped like a part of a globe or like a sharp wedge. Further, the invention is not limited to such configuration that the peaks 11a, 11b abut the support arm 2 at a point, but the peaks 11a, 11b are also preferable to make line or surface abutment thereon.

Also, the support arm 2 is provided with a slider 1 having a magnetic head (not shown) on a surface opposing to the magnetic recording medium 12 on its surface opposing to the magnetic recording medium 12 at one end thereof.

Further, the coil 3 fitted to the coil holder 8 connected to the other end of support arm 2 forms the voice coil motor (hereinafter referred to as VCM) 24 together with magnet 20 disposed on chassis 15 of the magnetic disk drive 23, upper yoke 19, and lower yoke 21. By the action of the VCM 24, the support arm 2 can be rotated radially of the magnetic recording medium 12 about the bearding portion 10.

Although it is not shown in Fig. 1 for the purpose of simplifying the description, the upper yoke 19 of the magnetic disk drive 23 in the preferred embodiment is shaped nearly similar to the lower yoke 21. However, the present invention is not limited at all with respect to the shapes of upper yoke 19 and lower yoke 21.

Also, the bearing portion 10 is rotatably fitted to the chassis 15 by means of setscrew 7 formed via a bearing.

Further, the magnetic recording medium 12 is rotatably supported by the spindle motor 5 or a rotating means. When the magnetic disk drive 23 is in its recording or reproducing mode, that is, when the magnetic head is in a state of being loaded, because of the flying force of the slider 1 due to the air flow generated by the rotation of the magnetic recording medium 12 driven by the spindle motor 5 and the activating force of the head support unit 9 that serves to move the slider 1 to the magnetic recording medium 12, the magnetic head mounted on the slider 1 obtains a specific amount of flying hight against the magnetic recording medium 12 while executing the recording or reproducing operation.

In this case, a predetermined load is applied to the slider 1 in the direction of magnetic recording medium 12. The load is given by the plate spring 4 or an resilient member disposed on the head support unit 9.

As shown in FIG. 2, since the slider 1 is supported by gimbal mechanism 13 using a gimbal spring and can be inclined in the rolling and pitching directions via dimple 14, the gimbal mechanism 13 may absorb the unnecessary inclination of the slider 1 in the rolling and pitching directions against the magnetic recording medium 12 when the magnetic disk drive 23 is in recording or reproducing mode.

All the operations such as rotation and stop of the magnetic recording medium 12, and rotation of the support arm 2 are controlled by the control means 25 in FIG. 1.

Each member will be described in the following. In the present preferred embodiment, the support arm 2 is integrally formed from a metal such as stainless steel (SUS304). It is also possible to use an etching process or pressing process for the purpose of forming the support arm 2.

Next, the plate spring 4 is formed from a metal such as stainless steel (SUS304). It is also possible to finish and form the plate spring by means of an etching process or pressing process.

Also, the coil holder 8 is formed from a metal such as Al or resin material such as PPS (polyphenylsulfide) or LCP (liquid crystal polymer). It is also possible to form the coil holder by using a die casting process or pressing process in the case of Al, and a well-known resin forming process in the case of PPS or LCP.

The upper yoke 19 and lower yoke 21 are formed from a soft magnetic material such as SECC (galvanized sheet iron), and can be finished and formed by using a pressing process.

Also, neodymium, iron or boron type rare earth magnet and the like can be used as magnet 20.

For the connection between the members, well-known methods such as spot-welding process, supersonic welding process, and laser welding process can be employed.

The present invention is not limited at all with respect to the manufacturing method for each component or the method of connection between individual members.

In the magnetic disk drive 23 of the present invention, the support arm 2 can be integrally formed by using a highly rigid material because of such configuration of the head support unit 9.

Accordingly, the head support unit 9 can be formed by using a highly rigid material, including the pivot bearing 11, the peaks 11a, 11b of the pivot bearing 11, and the whole area ranging from the area supported by the pivot bearing 11 of the support arm 2 to the area where the slider 1 is formed.

Since the support arm 2 is formed from such highly rigid material, the impact resistance to external impact (shock) or the like is improved, and also, the resonant frequency of the support arm 2 can be enhanced. As a result, there is no conventional problem like generation of vibration mode and no need of settling operation. Thus, the rotation and positioning of the support arm 2 can be made at high speeds and it is possible to increase the access speed of the magnetic disk drive 23. For example, when the support arm 2 is formed from stainless steel, the resonant frequency can be greatly increased from a conventional level of about 2 kHz to a level of about 10 kHz. Therefore, it is possible to obtain a magnetic disk drive which is higher in rotating speed of the head support unit and the access speed than in the prior art.

Also, the plate spring 4 as a resilient member is not built into the structure of the support arm 2 but disposed separately from the support arm 2. Accordingly, for the purpose of adjusting the load to the slider 1, it is possible to adjust the load by changing the thickness or the material of plate spring 4 and selecting the strength and spring constant of the plate spring 4 without remodeling the support arm 2.

Further, according to the configuration in use of the head support unit 9, the center of gravity of the portion held by the plate spring 4, for example, when rotated by the VCM 24, the center of gravity of the support arm 2 with the coil 3 and coil holder 8 fitted thereon is identical with the intersection between the rotational axis in the direction radial to the magnetic recording medium 12 of the support arm 2 and the rotational axis in the direction vertical to the recording surface of the magnetic recording medium 12. That is, by designing the head support unit 9 so that the center of gravity is substantially identical with the middle point (point P in FIG. 1) on the line connecting the points at which the support arm 2 abuts the peaks 11a, 11b of the pivot bearing 11, it is possible to provide a head support unit which is vibration-resistant and stable against external impact(shock) or the like. In this case, it is possible to provide a head support unit capable of ensuring highest impact resistance. And, some deviation of the center of gravity will cause no problems in actual use.

The means to shelter the magnetic head and its operation in the magnetic disk drive of the present embodiment will be described in the following.

In FIG. 1 and FIG. 2, CSS area 16 for sheltering the slider 1 disposed at one end of the support arm 2 is provided in the specified area at the inner periphery of the magnetic recording medium 12.

The surface of the CSS area 16 is rougher as compared with the area capable of magnetic recording other than the CSS area 16 so that attraction (stiction) is hard to take place between the slider 1 or the magnetic head and the magnetic recording medium 12.

When the magnetic recording medium 12 stops rotating, one end having the slider 1 of the support arm 2 is rotated inwardly of the magnetic recording medium 12. As for the slider 1 disposed at one end of the support arm 2, since the air flow lessens causing the flying power to be lowered as the rotation of the magnetic recording medium 12 is slowed down, the slider 1 finally comes into contact with the magnetic recording medium 12 at the CSS area 16 and then stops there.

Also, as shown in FIG. 2, in the head support unit 9 of the disk drive 23 of the present invention, the coil 3 is held between the upper yoke 19 and the magnet 20. As shown in FIG. 4, the coil holder 8 is provided with projection 6 as a stop means, and the upper yoke 19 is provided with convex 19b and catch hole 19a in order to stop the projection 6. It is preferable to form the projection 6 simultaneously when the coil holder 8 is formed by using same material as for the coil holder 8, or to dispose a member formed from a metal with excellent slidability such as stainless steel (SUS420J2) on the coil holder 8. Also, the convex 19b is configured so as to be protruded in the direction of the coil holder 8.

By using the configuration, when the magnetic drive disk 23 is stopped, it is possible to reduce the activating force to the slider 1 or the magnetic recording medium 12 of the magnetic head, or to move the slider 1 or the magnetic head apart from the magnetic recording medium 12. Accordingly, the load applied to the spindle motor 5 can be remarkably decreased when the magnetic recording medium 12 is rotated at start of the magnetic disk drive 23.

The mechanism capable of decreasing the load applied to the spindle motor 5 will be described in detail with reference to FIG. 4. FIG. 4 is a schematic diagram showing the positional relation between the other end of the head support unit 9 (coil 3 and coil holder 8 are shown), the upper yoke 19 and the magnet 20 in the range from start to stop of the magnetic disk drive 23.

As shown in FIG. 4, projection 6 is formed on the coil holder 8, and the upper yoke 19 is provided with catch hole 19a and convex 19b. When the magnetic recording medium 12 is rotating, that is, when the magnetic head is loaded on the magnetic recording medium 12, the head support unit 9 with the projection 6 is rotated in a state of being apart from the upper yoke 19 as shown in FIG. 4(a).

Figure 4A:
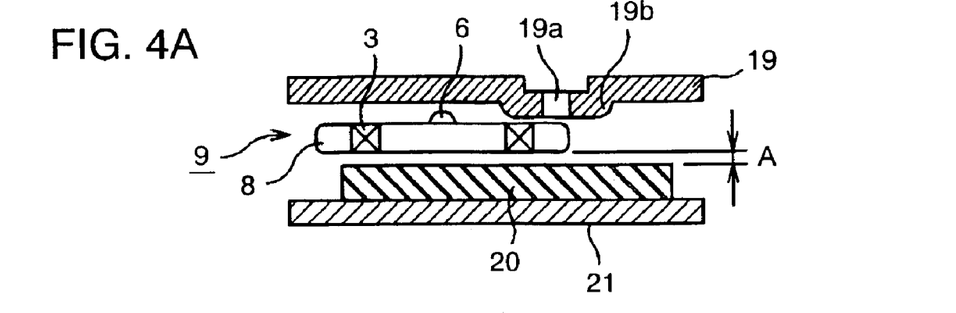
FIG. 4 is a schematic diagram showing the operation of the other end portion of a head support unit in the unload mode of a magnetic disk drive in the preferred embodiment of the present invention.
Figure 4B:
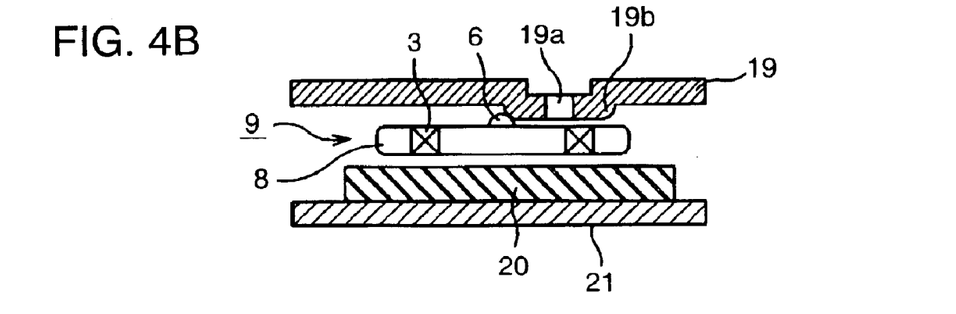

Next, when the rotation of the magnetic recording medium 12 is stopped and the magnetic head is sheltered, the support arm 2 rotates radially of the magnetic recording medium 12, and one end with the slider 1 of the support arm 2 is rotated inwardly of the magnetic recording medium 12, while the other end of the head support unit 9 including coil holder 8 shown in FIG. 4(a) is rotated to the right as viewed in the figure to get into a state as shown in FIG. 4(b), and then the projection 6 on the coil holder 8 abuts the upper yoke 19.

When the slider 1 disposed at one end of the head support unit 9 comes into the CSS area 16, the projection 6 on the coil holder 8 almost simultaneously abuts the upper yoke 19, while the other end of the head support unit 9 provided with the coil holder 8 is given an activating force downward as viewed in FIG. 4, and one end provided with the slider 1 of the head support unit 9 is activated so as to move off from the magnetic recording medium 12. In the scope of this specification and claims, the direction downward as viewed in FIG. 4 is stated as the direction of moving closer to the magnetic recording medium 12, and the direction upward as viewed in FIG. 4 is stated as the direction of moving apart from the magnetic recording medium 12.

Figure 4C:
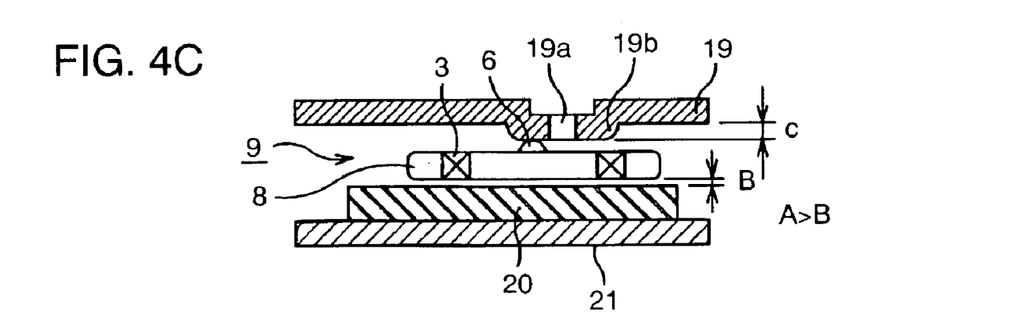

Further, as the support arm 2 is rotated, as shown in FIG. 4(c), the projection 6 disposed on the coil holder 8 at the other end of the head support unit 9 abuts the upper yoke 19 and slides thereon generating a frictional force, while the other end of the head support unit 9 is activated in a direction toward the magnet 20. At the time, distance B between the coil holder 8 and the magnet 20 is less than distance A shown in FIG. 4(a). This operation is obtainable because the head support unit 9 of the present invention is able to rotate in the direction vertical to the recording surface of the magnetic recording medium 12.

Figure 4D:
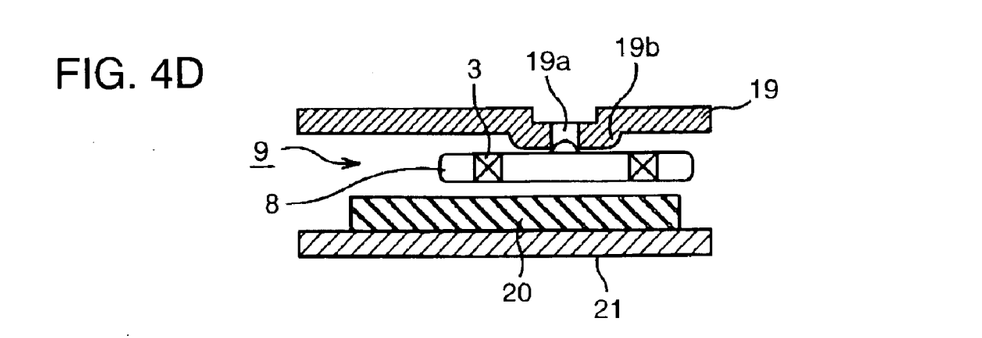

As the support arm 2 is further rotated, as shown in FIG. 4(d), the projection 6 on the coil holder 8 is stopped by the catch hole 19a disposed in the upper yoke 19.

In this way, since the whole of the head support unit 9 is held against the upper yoke 19, it is possible to provide a magnetic disk drive 23 which may assure excellent impact resistance against external vibrations or the like.

When the magnetic disk drive 23 of the present preferred embodiment is in stop mode, the slider 1 in a state shown in FIG. 4(d) is held in contact with the CSS area 16, and one end portion with the slider 1 formed thereon of the support arm 2 is given an activating force in a direction to move off from the magnetic recording medium 12. Accordingly, the frictional force between the slider 1 or the magnetic head and the magnetic recording medium 12 becomes lowered, then attraction (stiction) is hard to take place between the magnetic head or the slider 1 and the magnetic recording medium 12. As a result, it is possible to make the torque required for the spindle motor 5 at start far less than that required in the prior art.

The activating force to the slider 1 in a direction to move off from the magnetic recording medium 12 can be easily adjusted by regulating the height of the convex 19b formed on the upper yoke 19.

That is, it is possible to increase the activating force to the slider 1 formed at one end of the support arm 2 in a direction of moving apart from the magnetic recording medium 12 by increasing the height C, and to decrease the activating force by decreasing the height C.

When the height C exceeds a specific height, the activating force to the slider 1 in the direction of moving apart from the magnetic recording medium 12 is greater than the activating force given to the slider 1 in the direction of approaching the magnetic recording medium 12 according to the head support unit 9. Consequently, the magnetic recording medium 12 and the slider 1 move apart from each other. In that case, since there is no fear of attraction (stiction) generated between the magnetic recording medium 12 and the slider 1, it is not necessary to roughen the surface of the CSS area 16 as described above. Also, it is not necessary to provide the CSS area 16, and the recording surface of the magnetic recording medium 12 can be effectively used.

By using the configuration, when the magnetic disk drive 23 is stopped, it is possible to lessen the frictional force between the slider 1 or the magnetic head and the magnetic recording medium 12 or to keep the slider 1 or the magnetic head apart from the magnetic recording medium 12. Accordingly, at start of the magnetic disk drive 23, the load applied to the spindle motor 5 can be remarkably reduced when the magnetic recording medium 12 is rotated.

Thus, the torque required for the spindle motor 5 can be lessened, and therefore, even when the whole of the magnetic disk drive 23 is reduced in size, the portion of the spindle motor 5 can be reduced in size while meeting the need of the required torque. Accordingly, it is possible to make smaller and thinner the whole of the magnetic disk drive 23.

According to the magnetic disk drive of the present preferred embodiment, since it is not necessary to have a ramp portion to hold the support arm 2 when the magnetic disk drive is stopped as is in the load/unload system (L/UL system), it is possible to realize a thin magnetic disk drive which may assure excellent impact resistance.

In the present preferred embodiment, the projection 6 is disposed on the coil holder 8, and the upper yoke 19 is provided with the catch hole 19a and the convex 19b. However, the present invention is not limited to this configuration, but it is also preferable to form the projection 6 on the upper yoke 19 and to provide the coil holder 8 with the catch hole 19a and the convex 19b.

Further, as shown in FIG. 5, it is also preferable, without making the catch hole 19a, to use a configuration such that the projection 6 is formed on the coil holder 8, and the frictional force generated between the projection 6 and the convex 19b of the upper yoke 19 serves to push the other end of the head support unit 9 with the coil holder 8 formed thereon, giving it a force downward as viewed in the figure. In this case, the projection 6 is preferable to be formed on the upper yoke 19.

Figure 5A:
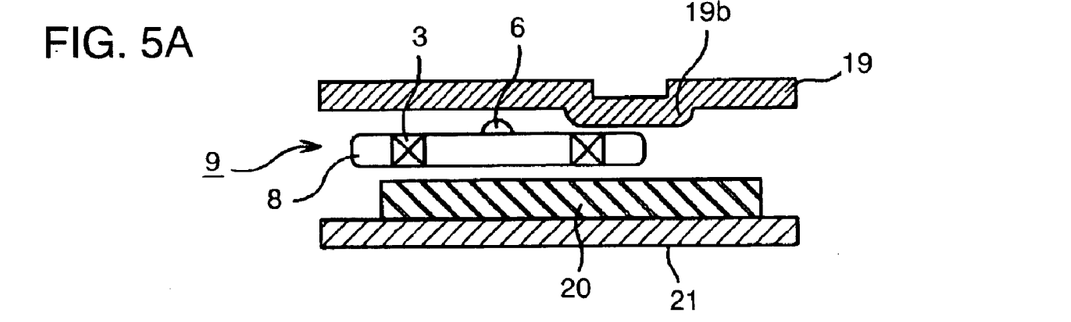
FIG. 5 is a schematic diagram showing the operation of the other end portion of a head support unit in unload mode of a magnetic disk drive of another configuration in the preferred embodiment of the present invention.
Figure 5B:
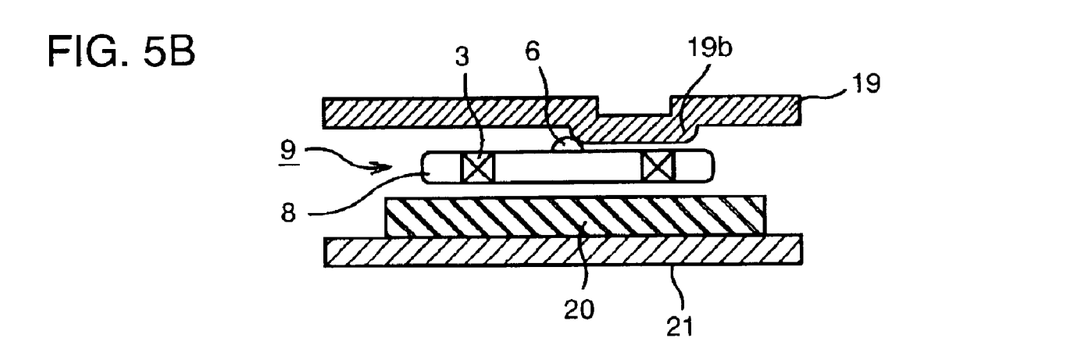
Figure 5C:
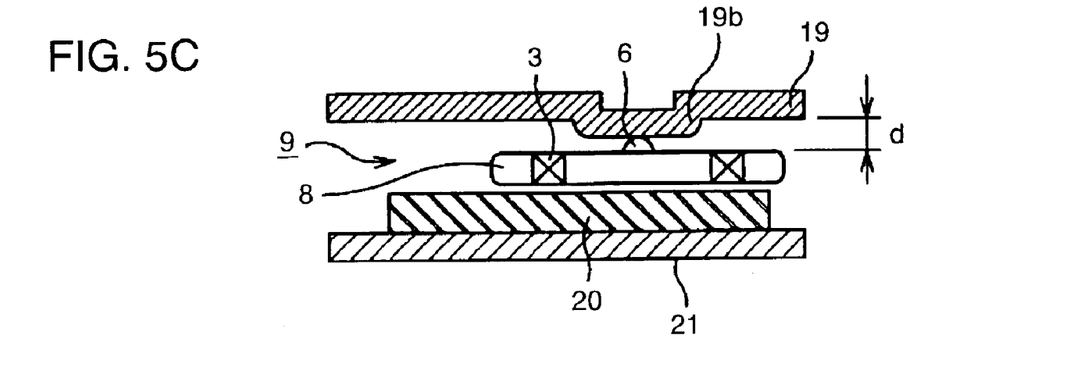

FIG. 5 is a schematic diagram for describing the operation in unloading of the head support unit of the disk drive having a friction means. FIG. 5(a), FIG. 5(b), and FIG. 5(c) correspond to FIG. 4(a), FIG. 4(b), and FIG. 4(c) respectively, showing the positional relations of each member in corresponding operations.

In the case of a configuration using a friction means shown in FIG. 5, the level of the activating force to the head support unit 9 can be adjusted by regulating the total height of the projection 6 and convex 19b, or the size of d in FIG. 5.

That is, increasing the height d increases the activating force to the slider 1 formed at one end of the support arm 2 in the direction of moving apart from the magnetic recording medium 12, and the activating force can be decreased by decreasing the height d.

When the height d exceeds a specific height, the activating force to the slider 1 in the direction of moving apart from the magnetic recording medium 12 becomes greater than the activating force previously given by the head support unit 9 to the slider 1 in the direction of approaching the magnetic recording medium 12. As a result, the magnetic recording medium 12 and the slider 1 are separated from each other. In this case, there is no fear of attraction (stiction) generated between the magnetic recording medium 12 and the slider 1, and therefore, it is not necessary to roughen the surface of the CSS area 16 as described above. Further, there is no need of forming the CSS area 16, so that the recording surface of the magnetic recording medium 12 can be effectively used.

Also in this case, it is preferable to realize a low frictional coefficient on the sliding surfaces of the projection 6 and the upper yoke 19 by surface treatment such as coating with fluororesin and DLC (Diamond Like Carbon). In this way, it is possible to freely select the frictional coefficient of this portion by selecting the material or the like of the sliding surfaces of the projection 6 and the upper yoke 19.

By using the configuration, the load to VCM24 can be reduced.

Also, in the present preferred embodiment, the CSS area 16 is disposed on the inner periphery of the magnetic recording medium 12, but even in case of disposing the CSS area 16 on the outer periphery of the magnetic recording medium 12, completely same effects as described above will be obtained by the disk drive of the present invention.

Also, in the present preferred embodiment, a CSS type disk drive is described, but the disk drive of the present invention is not limited to the CSS type. For example, it can be applied to an L/UL type disk drive as well.

Figure 6:
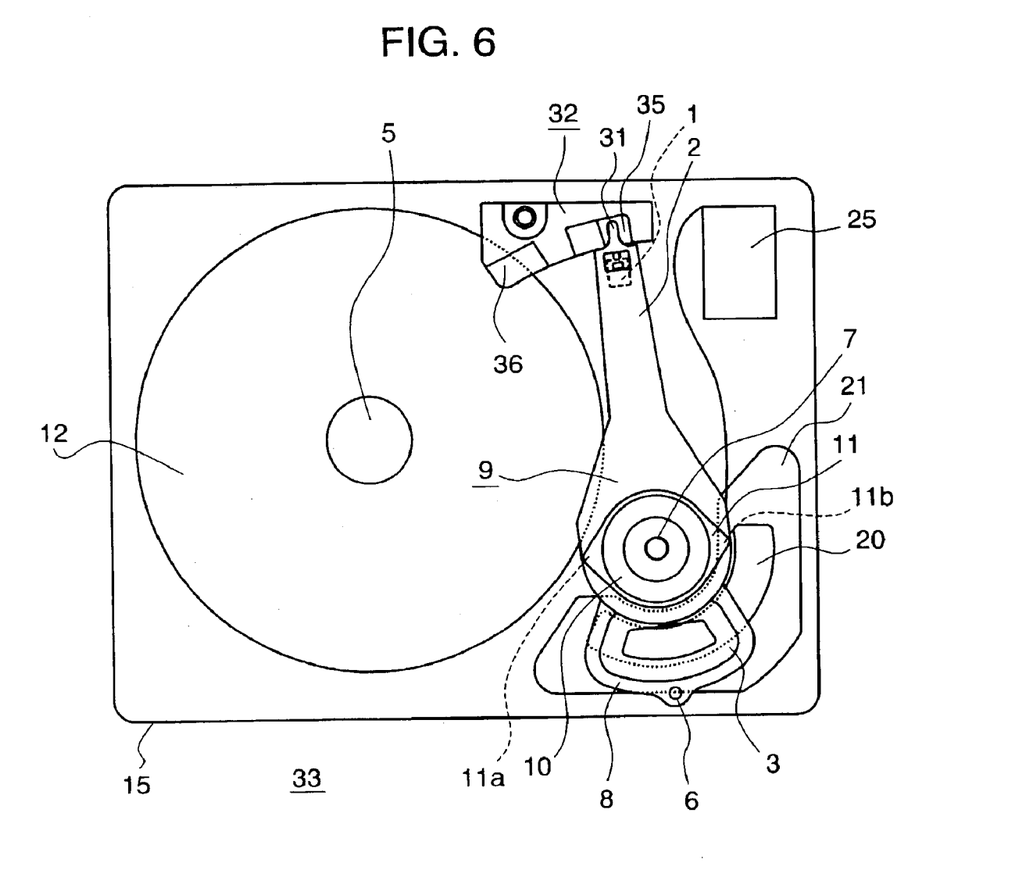
FIG. 6 is a plan view showing the configuration of an L/UL magnetic disk drive in the preferred embodiment of the present invention.
Figure 7:
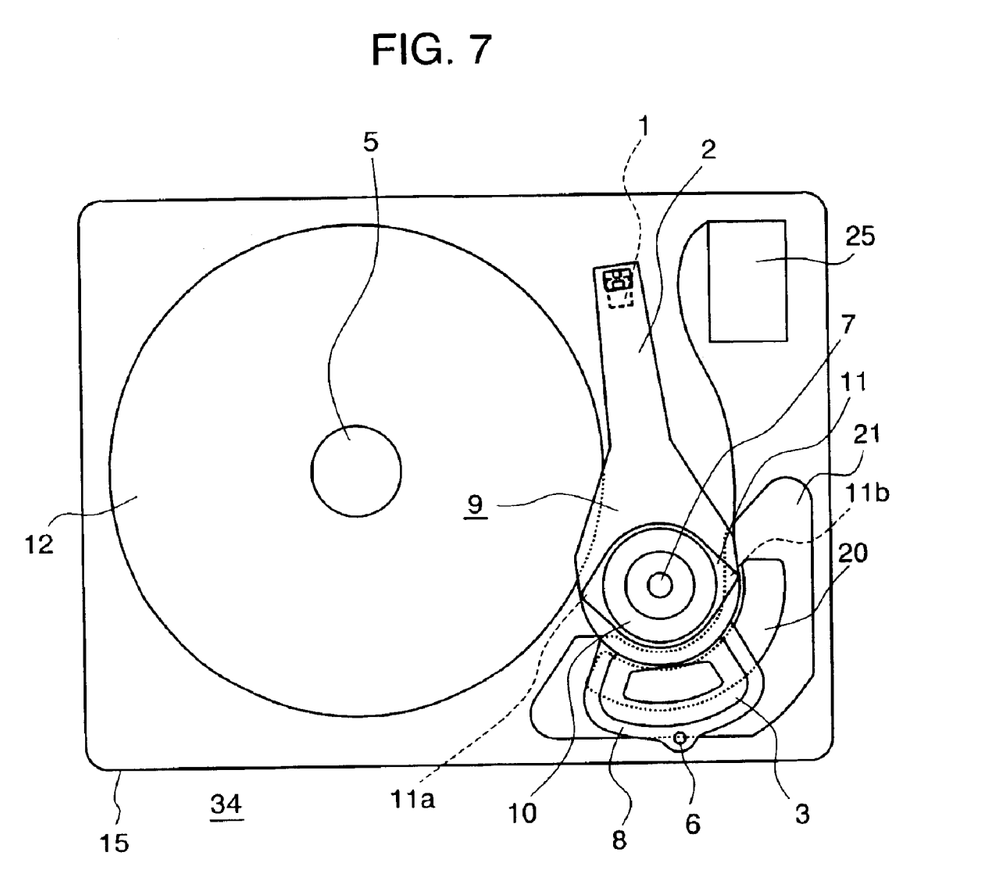
FIG. 7 is a plan view showing another configuration of an L/UL type magnetic disk drive in the preferred embodiment of the present invention.

FIG. 6 and FIG. 7 are the examples of L/UL type disk drive in the preferred embodiment of the present invention. In magnetic disk drive 33 shown in FIG. 6, it is configured that one end of the support arm 2 is rotated outwardly of the magnetic recording medium 12 in stop mode of the disk drive and that guide 31 disposed at the tip of support arm 2 is held on the holding portion 35 of ramp 32 disposed at the outer periphery of the magnetic recording medium 12. In the case of such configuration, for example, it is possible to be configured in that when the guide 31 goes onto taper 36 formed at ramp 32, the upper yoke 19 abuts the coil holder 8, generating a frictional force, and when the guide 31 comes into the area of the holding portion 35 formed at the ramp 32, the projection 6 on the coil holder 8 is fitted in the catch hole 19a formed in the upper yoke 19 as shown in FIG. 2, thereby holding the support arm 2. In this way, it is possible to realize a configuration further improved in impact (shock) resistance.

Also, as in magnetic disk drive 34 shown in FIG. 7, without disposing the ramp 32, it is preferable to be configured in that the support arm 2 is held by the frictional force between the upper yoke 19 and coil holder 8 or by the stoppage between the catch hole 19a formed in the upper yoke 19 and the projection 6 formed on the coil holder 8. In this case, since the ramp 32 is not needed, it is possible to more reduce the size of the magnetic disk drive 34.

Further, in the present preferred embodiment, the upper yoke 19 and the lower yoke 21 are shown as individual members, but the disk drive of the present invention is not limited to this configuration. It is also preferable to be configured in that at least one of the upper yoke 19 and the lower yoke 21 serves as chassis 15 as well. Moreover, using a U-shaped or a like one-piece yoke which serves as both the upper yoke 19 and the lower yoke 21 is of course within the scope of the disk drive of the present invention.

In the preferred embodiment of the present invention, a magnetic disk drive using a magnetic head has been described. However, the disk drive of the present invention is able to bring about similar effects even when used as a non-contact type disk recording and reproducing apparatus such as an optical disk drive or optical magnetic disk drive.

For example, it can be used as an optical disk drive, optical magnetic disk drive, and DVD (Digital Versatile Disk).

Also, in the preferred embodiment of the present invention, as for the rotation of the support arm against the recording medium, the rotational center is the bearing portion in the example shown, and the rotating direction is radial to the recording surface of the recording medium, but the present invention is not limited to this configuration. For example, a configuration in which the support arm moves in parallel (linear) relation with the recording surface of the recording medium is of course within the scope of the disk drive of the present invention.

As described above, by using the disk drive of the present invention, it is possible to provide a disk drive having a simplified configuration and capable of assuring excellent impact(shock) resistance.

It will be obvious to those having skill in the art that many changes may be made in the above-described details of the preferred embodiments of the present invention. The scope of the present invention, therefore, should be determined by the following claims.

What is claimed is:

1. A disk drive comprising:
   a support arm having a head at one end thereof, which is rotatably disposed in a direction vertical to the recording surface of a recording medium; and
   a first member which abuts the other end of said support arm when said support arm is moved in a direction along the recording surface of said recording medium, thereby generating a frictional force against said support arm, wherein said first member abuts the other end of said support arm, causing said support arm to stop rotating, wherein a projection is disposed at the other end of said support arm, and a catch hole is formed in said first member, and said projection is fitted in said catch hole, causing said support arm to stop rotating.

2. A disk drive comprising:
   a support arm having a head at one end thereof, which is rotatably disposed in a direction vertical to the recording surface of a recording medium; and
   a first member which abuts the other end of said support arm when said support arm is moved in a direction along the recording surface of said recording medium, thereby generating a frictional force against said support arm, wherein said support arm comprises a bearing portion, and said bearing portion is provided with a second member which comes in contact with said support arm, and said support arm, fulcrumed on a point at which said second member comes in contact with said support arm, rotates in a direction vertical to the recording surface of said recording medium.

3. The disk drive of claim 2, wherein said second member is a pivot bearing having a pair of peaks.

4. The disk drive of claim 2, wherein said support arm rotates about the center of said bearing portion in a direction along the recording surface of said recording medium.

5. The disk drive of claim 4, wherein points at which said second member abuts said support arm are vertical to the axial direction of said bearing portion and to the longitudinal direction of said support arm and are positioned on a line passing through the rotational center of said bearing portion.

6. The disk drive of claim 4, wherein the center of gravity of the portion held by said resilient portion is positioned at an intersection between the axis of said bearing portion and the rotational center axis in a direction vertical to the recording surface of said recording medium of said support arm.

7. The disk drive of claim 2, wherein the points at which said second member abuts said support arm are provided in symmetrical relation to the center line in the longitudinal direction of said support arm.

8. A disk drive comprising:

a support arm having a head at one end thereof, which is rotatably disposed in a direction vertical to the recording surface of a recording medium; and a first member which abuts the other end of said support arm when said support arm is moved in a direction along the recording surface of said recording medium, thereby generating a frictional force against said support arm, wherein the support arm is provided with a resilient portion which gives an activating force to said support arm so that said one end of the support arm approaches the recording surface of said recording medium.

9. The disk drive of claim 8, wherein said resilient portion is a plate spring.

* * * * *